(12) United States Patent
Gantt et al.

(10) Patent No.: US 6,579,914 B1
(45) Date of Patent: Jun. 17, 2003

(54) COATING COMPOSITIONS FOR OPTICAL WAVEGUIDES AND OPTICAL WAVEGUIDES COATED THEREWITH

(75) Inventors: Todd W. Gantt, Catawba, NC (US); Michael B Purvis, Hickory, NC (US); Igor V. Khudyakov, Hickory, NC (US); Bob J. Overton, Lenoir, NC (US)

(73) Assignee: Alcatel, Paris (FR)

( * ) Notice: Subject to any disclaimer, the term of this patent is extended or adjusted under 35 U.S.C. 154(b) by 133 days.

(21) Appl. No.: 09/617,580

(22) Filed: Jul. 14, 2000

(51) Int. Cl.⁷ .............................. C08F 2/46; C08F 2/50
(52) U.S. Cl. .............................. 522/92; 522/7; 522/25; 522/28; 522/90; 522/96; 522/100; 522/101; 522/103; 522/111; 522/113; 522/122; 522/134; 522/143; 428/378; 428/426; 428/441
(58) Field of Search .............................. 522/92, 96, 111, 522/113, 122, 134, 143, 90, 100, 101, 103, 7, 25, 28; 428/378, 426, 441

(56) References Cited

U.S. PATENT DOCUMENTS

| | | |
|---|---|---|
| 4,099,837 A | 7/1978 | Vazirani |
| 4,256,828 A | 3/1981 | Smith |
| 4,284,731 A | 8/1981 | Moser et al. |
| 4,311,726 A | 1/1982 | Hacker et al. |
| 4,374,161 A | 2/1983 | Geyling et al. |
| 4,525,258 A | 6/1985 | Watanabe et al. |
| 4,607,084 A | 8/1986 | Morris |
| 4,624,994 A | 11/1986 | Ansel |
| 4,836,832 A | 6/1989 | Tumey et al. |
| 4,904,051 A | 2/1990 | Broer et al. |
| 4,962,992 A | 10/1990 | Chapin et al. |
| 5,043,221 A | 8/1991 | Koleske |
| 5,104,433 A | 4/1992 | Chapin et al. |
| 5,139,872 A | 8/1992 | Lapin et al. |
| 5,229,433 A | 7/1993 | Schunck et al. |
| 5,381,504 A | 1/1995 | Novack et al. |
| 5,476,748 A * | 12/1995 | Steinmann et al. ......... 430/269 |
| 5,639,846 A | 6/1997 | Shustack |
| 5,744,514 A | 4/1998 | Shustack |
| 5,858,053 A | 1/1999 | Kuck et al. |
| 5,907,023 A | 5/1999 | Chawla |
| 5,913,004 A | 6/1999 | Takase et al. |
| 5,985,952 A | 11/1999 | Levy |
| 6,197,422 B1 * | 3/2001 | Murphy et al. ............. 428/378 |
| 6,261,645 B1 * | 7/2001 | Betz et al. ................. 427/500 |

FOREIGN PATENT DOCUMENTS

WO    WO/99 63017 A    12/1999

OTHER PUBLICATIONS

"A Study of Epoxy Resin—Acrylated Polyurethane Semi–Interpenetrating Polymer Networks," *Journal of Applied Polymer Science*, vol. 68, 11–119 (1998).

Interpreting Polymer Network–Containing UV Curable Coatings, by Xiao, Database Accession No. 130:96873—Abstract, vol. 12, No. 5, 1998, pp. 27–35.

Database WPI, Section Ch, Week 199017, Derwent Publications Ltd., London, GB; Mar. 15, 1990 (Mar. 15, 1990) Abstract, Asahi Denka Kogyo K.K.

Product Information, from UCB Radcure on UV Curable Epoxides and Vinyl Ethers (Undated).

Invited Paper, Ultraviolet–cured coatings for optical fibers–the effect of coating design on fibre reliability, by Edwards, et al., SPIE vol. 2074, pp. 120–128.

* cited by examiner

Primary Examiner—James J. Seidleck
Assistant Examiner—Sanza L. McClendon
(74) Attorney, Agent, or Firm—Sughrue Mion, PLLC

(57) ABSTRACT

A composition for coating an optical waveguide, more specifically, an optical fiber, and optical fibers coated therewith. The coating composition is a radiation curable composition including an aliphatic epoxide, a urethane acrylate oligomer, a reactive diluent, and cationic and free-radical photoinitiators. The cationic photoinitiator acts upon the aliphatic epoxide while the free-radial photoinitiator acts upon the urethane acrylate oligomer. The resulting cured coating forms an interpenetrated polymer network. The properties of coatings in accordance with the invention including the glass transition temperature thereof, can be tailored to achieve advantageous coatings suitable for use as primary coatings and secondary coatings for an optical fiber.

46 Claims, No Drawings

COATING COMPOSITIONS FOR OPTICAL WAVEGUIDES AND OPTICAL WAVEGUIDES COATED THEREWITH

BACKGROUND OF THE INVENTION

1. Field of the Invention

The invention relates to compositions for coating glass surfaces and, more specifically, coating compositions for optical waveguides such as optical fibers, the coating compositions having improved mechanical characteristics and adhesion to the glass.

2. Description of the Related Prior Art

Optical fiber waveguides have been coated with plastic compositions of various materials in order to protect the fiber and increase its tensile strength. The coating materials that have been utilized include polyvinylidene fluoride, polymethylsiloxane, polyesters, polyimides, polyester imides, epoxides and polyurethanes.

For example, U.S. Pat. No. 4,099,837 discloses a coating composition for an optical fiber waveguide, the coating composition is a prepolymer made by mixing certain epoxy resins and reacting the mixture with acrylic and/or methacrylic acid. The mixture contains an aliphatic-type glycidyl ether and an aromatic-type glycidyl ether, such as a mixture of 1,4-butanediol diglycidyl ether and a diglycidyl ether of bisphenol A or substituted, e.g., halogenated, bisphenol A, such as brominated bisphenol A. The proportion of aliphatic diglycidyl ether to aromatic diglycidyl ether is 0.4 to 1.0 on a weight ratio basis. The epoxy resin mixture is reacted with acrylic and/or methacrylic acid on an equivalent basis with between 0.5 to 1.0 mol of acid per epoxy equivalent weight, and preferably 0.8–0.95 mol of acid per equivalent weight.

U.S. Pat. No. 4,311,726 discloses a method for manufacturing an optical waveguide with a plastic layer of the epoxy-acrylate type located on the lightguide fiber. A radiation-hardenable prepolymer composition is applied to the lightguide fiber immediately after the fiber-drawing process. The prepolymer is hardened by actinic radiation and includes an acylated hydroxy ester of acrylic and/or methacrylic acid and an epoxide.

U.S. Pat. No. 5,229,433 discloses a liquid, radiation-curable coating composition for the coating of glass surfaces. The coating composition includes 56 to 89% by weight of one or more diethylenically unsaturated polyurethanes optionally containing urea groups, 3 to 30% by weight of one or more ethylenically unsaturated monomers, 0.5 to 8% by weight of one or more photoinitiators and 0.05 to 6% by weight of an alkoxysilane. The ethylenically unsaturated monomers include one or more ethylenically unsaturated monomers containing carboxyl groups, optionally together with other ethylenically unsaturated monomers, and the alkoxysilane contains epoxide groups. The coating compositions are used for the coating of optical glass fibers.

U.S. Pat. No. 5,985,952 discloses a radiation curable primary coating composition for coating an optical fiber composed of a component having a first end and a second end, a sauturated aliphatic backbone based upon a polyethylene/butylene structure, and at least one epoxide group at the first end of the component and at least one reactive functional group at the second end. The composition described also contains a mixture of acrylate monomers, one being monofunctional and one being at least difunctional. The patent also teaches the use of vinyl ether monomers in conjunction with the aliphatic backbone/epoxide moiety to form an IPN.

While the conventional coating compositions have been adequate for most applications, it would be desirable to be able to tailor the properties of a coating formulation for improved stress relaxation properties and still maintain good mechanical characteristics and adhesion to glass.

SUMMARY OF THE INVENTION

Accordingly, an object of the invention is to provide a new coating composition for optical fibers, whereby the characteristics of the cured coating can surprisingly be tailored to achieve a desired optical fiber coating specification or specifications.

Another object of the invention is to provide optical fibers coated with the coating composition in accordance with the present application.

These objectives and other objectives are achieved by providing a liquid, radiation curable composition for coating an optical fiber, and a optical fiber coated therewith. The coating composition includes an aliphatic epoxide, a urethane acrylate oligomer, a cationic photoinitiator, a free radical photoinitiator, and a reactive diluent. The cationic photoinitiator is present in the composition in an amount effective to initiate polymerization of the aliphatic epoxide, and the free radical photoinitiator is present in the composition in an amount effective to initiate polymerization of the urethane diacrylate oligomer.

DETAILED DESCRIPTION OF THE PREFERRED EMBODIMENTS

The present invention provides an improved optical fiber coating composition that can be tailored by adjusting the molecular weight and polydispersity of the components of the composition to meet a particular set of optical fiber coating specifications for both primary and secondary coatings. As one skilled in the art would readily recognize, the properties of the coating compositions in accordance with the present invention can also be tailored by controlling the cure conditions, such as temperature, and level of oxygen present in the cure environment.

Compositions in accordance with the present invention include an aliphatic epoxide, a urethane acrylate oligomer, a reactive diluent, and suitable photoinitiators for the aliphatic epoxide and the urethane acrylate oligomer. While not wishing to be bound by theory, it is believed that the composition in accordance with the present invention forms an interpenetrated polymer network. In any event, the photocured composition while relatively hard, has some flexibility between the polymer chains, and can advantageously be tailored to meet the desired characteristic or characteristics of the coating.

Again, while not wishing to be bound by theory, it is believed that the aliphatic epoxide polymerizes under the influence of the cationic photoinitiator. Also, the urethane acrylate polymerizes under the influence of the free radical photoinitiator with some copolymerization with the reactive diluent. However, there is no or substantially no copolymerization between the aliphatic epoxide and the urethane acrylate.

Coating compositions in accordance with the present invention may advantageously be utilized for both primary and secondary coatings for optical fibers. As used herein, the term "primary coating" is defined as that coating which directly contacts the glass portion of the optical fiber. The primary coating should be liquid at room temperature. The primary coating should have a viscosity suitable for high speed processing, and the primary coating should have a high cure speed. The primary coating should exhibit good adhesion to glass to prevent premature delamination of the coating from the glass portion of the optical fiber. The primary coating should have a low modulus at lower temperatures to minimize the effects of microbend attenuation due to small stresses on the optical fiber itself. The primary coating should have a refractive index high enough to ensure that errant signals escaping from the glass core are refracted back to the core of the optical fiber.

As used herein, the term "secondary coating" is defined as the coating which covers the primary coating on the optical fiber. The secondary coating should have sufficient modulus to give impact resistance and to provide a protective barrier, and give tensile strength to the optical fiber. The secondary coating should exhibit little physical change over a wide temperature range, good resistance to water and solvent absorption and have good color stability. Both primary and secondary coatings should exhibit good characteristics of adhesion, but should still be strippable, such as for field splicing, etc.

When used as primary coatings, cured coatings in accordance with the present invention preferably have a glass transition temperature ($T_g$) of from about −60 C. to about 0° C., more preferably from about −50 to about −30° C., and most preferably about −40° C., and a low modulus of elasticity of from about 0.5 to about 3.0 MPa, more preferably from about 1.0 to about 2.0 MPa and most preferably about 1.6 MPa. When utilized as a secondary coating, cured coatings in accordance with the present invention preferably have a $T_g$ from about 40 to about 100° C., more preferably from about 50 to about 80° C., and most preferably about 75° C., and a low modulus of elasticity of from about 60 to about 900 Mpa, more preferably from about 500 to about 900 Mpa and most preferably about 700 Mpa.

Coating compositions in accordance with the present invention have a relatively narrow range of molecular weight (unless otherwise noted, all molecular weights expressed herein are weight average molecular weights), preferably ranging from about 100 to about 25,000, more preferably from about 500 to about 20,000, and most preferably about 10,000, when the composition is used as a primary coating. When utilized as a secondary coating, the molecular weight range is preferably from about 100 to about 10,000 more preferably from about 5,000 to about 7,000, and most preferably about 5,000. The polydispersity of the coating compositions in accordance with the present invention preferably ranges from about 1.0 to about 4.0, more preferably from about 1.2 to about 2.5, and most preferably about 2.1. Cured coatings prepared from coating compositions in accordance with the present invention have good adhesion to glass and good stress characteristics.

As used herein, the term "aliphatic epoxides" includes, for example, cycloaliphatic epoxides. Suitable aliphatic epoxide resins for purposes of the present invention are those having at least one oxirane functionality; and preferably up to 3 or 4 epoxide functionalities. The molecular weight of the aliphatic epoxide is preferably from about 150 g/mole to about 2,000 g/mole, more preferably from about 150 g/mole to about 1500 g/mole and most preferably about 500 g/mole. The epoxide may exhibit other functionalities such as hydroxyl and or vinyl unsaturation within the molecule. For example, the aliphatic epoxide may be a cycloaliphatic epoxide including a 3,4-epoxycyclohexylmethyl-3,4-epoxycyclohexane carboxylate having the general formula (I):

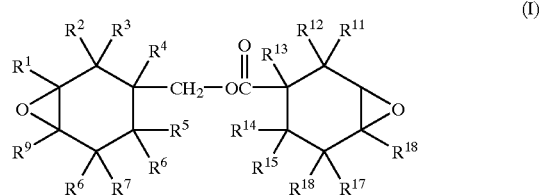

wherein $R^1$ through $R^{18}$ which can be the same or different, are hydrogen or alkyl radicals generally containing one to nine carbon atoms inclusive, and preferably containing one to three carbon atoms inclusive, as for example methyl, ethyl, n-propyl, n-butyl, n-hexyl, 2-ethylhexyl, n-octyl, n-nonyl and the like. Preferably, $R^1$ through $R^{18}$ are each hydrogen.

Cycloaliphatic epoxide compounds within the scope of the above formula that may be used in the present invention include the following nonexhaustive list: 3,4-epoxycyclohexylmethyl-3,4-epoxycyclohexane carboxylate; 3,4-epoxy-1-methylcyclohexyl methyl-3,4-epoxy-1-methylcyclohexane carboxylate; 6-methyl-3,4-epoxycyclohexymethyl-6-methyl-3,4-epoxycyclohexane carboxylate; 3,4-epoxy-3-methylcyclohexylmethyl-3,4-epoxy-3-methylcyclohexane carboxylate; and 3,4-epoxy-5-methylcyclohexylmethyl-3,4-epoxy-5-methylcyclohexane carboxylate. Cycloaliphatic epoxide resins suitable for use in the present invention are available from UCB Chemical Corp. of Smyrna, Ga. They are sold under the name Uvacure® and include Uvacure® 1500, 1530, 1531, 1532, 1533 and 1562. Other cycloaliphatic epoxide compounds suitable for use in the present invention will be apparent to one skilled in the art. In this regard, other suitable cycloaliphatic epoxide compounds are disclosed in U.S. Pat. No. 2,890,194, the disclosure of which is incorporated herein by reference.

Of course, other aliphatic epoxides may be utilized in the present invention including, but not limited to glycidyl ethers or esters having the following general formulae (II) and (III), respectively:

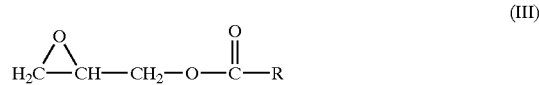

wherein R in both formulae (II) and (III) represents, for example, an acrylate group such as 1,2-epoxy propyl acrylate or 1,2-epoxy ethyl acrylate, a silane group such as an amino-functional silane, an acrylamido-functional silane, a mercapto-functional silane, an allyl-functional silane, a vinyl-functional silane, a methylacrylate-functional silane, and an acrylate-functional silane, or an aryl group, such as butyl, cresyl, phenyl, nonyl phenyl, p-tert-butyl phenyl and 2-ethyl hexyl. Preferably, the silane group is a mercaptoalkyl trialkoxy silane, a methacryloyxlalkyl trialkoxy silane, an aminoalkyl trialkoxyl silane, a vinyl trialkoxyl silane and mixtures thereof. More preferably, the silane is 3-aminopropyl triethoxy silane, 3-methacryloxypropyltrimethoxy silane, gamma-mercaptopropyl trimethoxy silane, gama-mercaptopropyl (gamma-mercaptopropyl)triethoxy silane, beta-(3,4-epoxycyclohexyl)ethyl trimethoxy silane, gamma-glycidoxypropyl trimethoxy silane, 3-vinylthiopropyl trimethoxy silane, vinyl-tris-(beta-methoxyethoxy)silane, or vinyl triacetoxy silane.

For example, the aliphatic epoxide may be a glycidyl ether epoxy resin prepared by reacting bisphenol A with epichlorohydrin, the resin having the following general (IV):

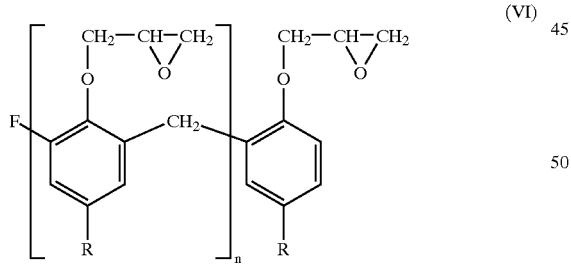

wherein n can be from 1 to about 30. It will be understood that the bisphenol A used to prepare the epoxide may be hydrogenated bisphenol A in which case the resulting epoxy resins are analogous to those of formula IV above but with hydrogenated rings.

The aliphatic epoxide may also be a glycidyl ether epoxy resin prepared by reacting bisphenol A with an alcohol such as n-butyl alcohol and epichlorohydrin, this resin having the following general formula (V):

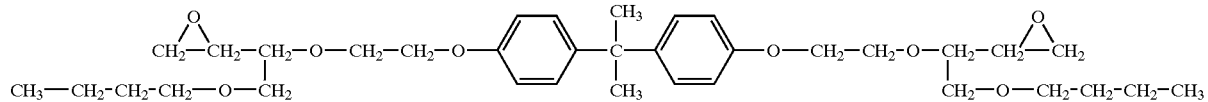

Suitable aliphatic epoxides for use in the present invention may also be prepared by reaction of novolac phenolic resins including, for example, o- or p-cresol formaldehyde novolacs, and epichlorohydrin, this resin having the following general formula (VI):

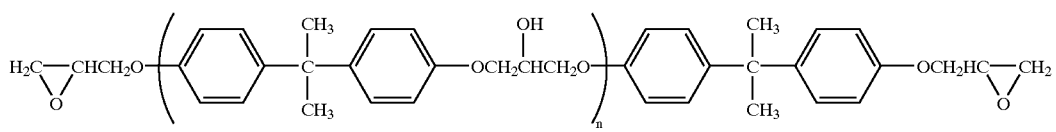

wherein n can be from 1 to about 50.

One skilled in the art will also recognize that a variety of other aliphatic epoxy products may be utilized in the present invention, including but not limited to epoxidized soy and linseed oils, as well as epoxy products made by the reaction of polyols including, for example, glycerol, sorbitol, and polyethylene or polypropylene glycols, with epichlorohydrin and a base catalyst, as is conventionally known. For example, the aliphatic epoxy may be a polyethylene glycol diglycidyl ether of the following general formula (VII):

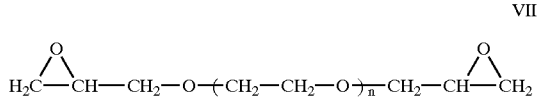

wherein n can be from 1 to about 40.

Also useful in the present invention are low molecular weight cycloaliphatic diepoxy compounds prepared by epoxidation of the corresponding alkenes, generally with peracetic acid. These compounds include, for example, 3,4-epoxycyclohexylmethyl 3',4'-epoxy-4-cyclohexylcarboxylate of formula (VIII) below and diglycidyl 1,2-cyclohexane dicarboxylate of formula (IX) below:

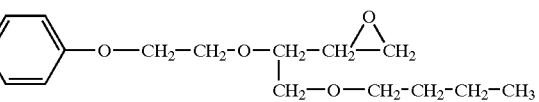

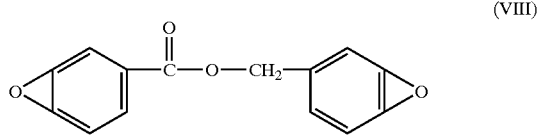

Other suitable aliphatic epoxides will be apparent to one skilled in the art. Also, mixtures of aliphatic epoxides may be used in the present invention.

The urethane acrylate oligomer of the present invention may be formed by reacting a polyol, for example a diol, with a multifunctional isocyanate, for example, a disocyanate, and then end-capping with a hydroxy-functional acrylate.

The polyol may be a polyether polyol, a polyester polyol, a polycarbonate polyol, a hydrocarbon polyol, a polybutadiene polyol, copolymers of the previously listed polyols, and mixtures of the foregoing.

The polyol may be a polyol with a number average molecular weight of about 200–10,000.

The polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more. Other suitable polyether polyols will be apparent to one skilled in the art.

The polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid. Other suitable polyester polyols will be apparent to one skilled in the art.

The polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$ $C_4$ alkylcarbonates such as, for example, dimethylcarbonate and diethylcarbonate. Other suitable polycarbonate polyols will be apparent to one skilled in the art.

If necessary, polyols with a relatively low molecular weight may be used. Examples of polyols with a relatively low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol (a reduction product of Japanese acid), chimyl alcohol, batyl alcohol, selachyl alcohol, and dimeric acid diol. Other suitable polyols with a relatively low molecular weight will be apparent to one skilled in the art.

The polybutadiene polyol may be, for example, hydroxyl-terminated, fully or partially hydrogenated 1,2-polybutadiene or 1,2-polybutadiene polyol hydrogenated to an iodine number of from 9 to 21.

The multi-functional isocyanate used in the present invention may be, for example, an aromatic polyisocyanate, an aromatic aliphatic polyisocyanate, an alicyclic polyisocyanate, and an aliphatic polyisocyanate.

Examples of the aromatic polyisocyanate include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2',5,5'-tetraisocyanate.

Examples of the aromatic aliphatic polyisocyanate include diisocyanates such as 1,3- or 1,4-xylylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanate include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1) heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1) heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanate include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight.

The hydroxy-functional acrylate may be, for example, 2-hydroxyethyl(meth)acrylate, 2-hydroxypropyl(meth) acrylate, 2-hydroxybutyl(meth)acrylate, 4-hydroxybutyl (meth)acrylate, pentanediol mono(meth)acrylate, 2-hydroxy-3-phenyloxypropyl(meth)acrylate, 2-hydroxyalkyl(meth)acryloyl phosphate, 4-hydroxycyclohexyl(meth)acrylate, cyclohexanedimethanol mono(meth)acrylate, neopentyl glycol mono(meth) acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl(meth)acrylate. The above hydroxyl group-containing (meth)acrylates may be used alone or in combination of two or more.

Suitable multifunctional isocyanates are toulene diisocyanate (TDI), isophorone diisocyanate (IPDI), and 4,4' methylene dicyclohexyl diisocyanate (Desmophen W., Bayer Co., USA). Suitable unsaturated monomers containing a hydroxyl group or groups are hydroxyethylacrylate (HEA) and hydroxyethylmethacrylate (HEMA). Suitable polyols are 1,6 hexanediol (Bayer Co. USA), PTG-L 1000 (polyether)(Hodogaya Chemical Co. of Japan), Duracarb™ 122 (Polycarbonate)(PPG Ind, USA), polycaprolactones such as the Tone™ polyester series manufactured by Union Carbide Co. USA, and polybutadiene polyols available from Shell Co. USA as Kraton™.

The molecular weight range of the urethane acrylate oligomer may vary from 500 to 20,000, preferably from 5,000 to 20,000 and more preferably from 5,000 to 15,000, based upon the specific requirements for properties of the primary and/or secondary coating in accordance with the present invention.

The urethane acrylate oligomer resin useful in accordance with the present invention may have the following general formula (X):

$$R^1-(I^1-P-)_n-I^2-R^2 \quad (X)$$

wherein $R^1$=independently, radiation curable functionality, such as hydroxyl ethyl acrylate or hydroxyl ethyl methacrylate $R^2$=independently, radiation curable functionality such as hydroxyl ethyl acrylate or hydroxyl ethyl methacrylate $I^{1,2}$=isocyanate such as IPDI, Desmophen W, TDI P=polyether polyol, polyester polyol, polycarbonate polyol, hydrocarbon polyol, polybutadiene polyol, co-polymer polyols of the same and mixtures of the same. (Depends on polyol selected)

Suitable polyester diol, polyether, polybutadiene and copolymer diol materials for use in the present invention include:

$$OH-CH_2-(CH_2-\underset{\underset{O}{\|}}{C}-O-CH_2-CH_2-\underset{\underset{O}{\|}}{C}-O-CH_2-CH_2)_{\overline{n}}CH_2-OH$$

where n=1 to 40
Polyester diol $$OH-CH_2-(CH_2-\underset{\underset{O}{\|}}{C}-O-CH_2-CH_2-CH_2-O-\underset{\underset{O}{\|}}{C}-CH_2)_{\overline{n}}CH_2-OH$$

where n=1 to 40
Polyether diol $$OH-(CH_2-CH_2-CH_2-CH_2-CH_2)-OH$$

Polybutadiene diol $$OH-CH_2-(CH_2-O-CH_2-CH_2)_{\overline{m}}CH_2-O-CH_2-(CH_2-CH-O-CH_2-CH_2-\underset{\underset{O}{\|}}{C}-CH_2)_{\overline{n}}CH_2-OH$$

where m and n each are 1 to 40
Copolymer diol

Suitable polyether-based, aliphatic urethane diacrylate compounds for use in the present invention are available from UCB Chemical Corp., of Smynra, Ga. They are sold under the name Ebercryl and include Ebecryl 230. Other polyether-based, aliphatic urethane diacrylate compounds suitable for use in the present invention will be apparent to one skilled in the art. In this regard, other suitable polyether-based, aliphatic urethane diacrylate compounds are disclosed in U.S. Pat. Nos. 4,284,731, 4,624,994, 4,607,084, 4,525,258, the disclosures of which are all incorporated herein by reference. Polyester-based, aliphatic urthane acrylate oligomers are available from Sartomer of Exton, Pa. or from Henkel. They are sold under the name CN966XXX, including CN966J75, and Photomer 6010, respectively.

In general, the aliphatic epoxide and the urethane diacrylate oligomer may be used in a weight ratio of aliphatic epoxide to urethane acrylate oligomer of from about 1:9 to about 9:1, more preferably about 1:3 to about 3:1, and most preferably about 1:1.

In accordance with the present invention, a cationic-type photoinitiator is used to initiate polymerization of the aliphatic epoxide, and a free radical-type photoinitiator is used to separately initiate the polymerization of the urethane acrylate.

Suitable cationic-type photoinitiators include, for example, aromatic onium salts, such as iodonium, sulfonium, arsonium, azonium, bromonium and selenonium salts. The onium salts are preferably chemically modified to render them more hydrophobic, for example, by incorporating saturated hydrocarbon moieties such as alkyl or alkoxy substituents of from about 4 to about 18 carbon atoms. Illustrative cationic photoinitiators that may be used in the present invention include the following: (4-octyloxyphenyl) phenyl iodonium hexafluoro antimonate; (4-octyloxyphenyl)diphenyl sulfonium hexafluoro antimonate; (4-decyloxyphenyl)phenyl iodonium hexafluoro antimonate; and (4-octadecyloxyphenyl)phenyl iodonium hexafluoro antimonate. Cationic photoinitiators suitable for use in the present invention are available from the Sartomer Company of Exton, Pa. They are sold under the name SARCAT™. Other suitable cationic photoinitiators will be apparent to one skilled in the art.

The cationic-type photoinitiator in accordance with the present invention may be used in an amount of about 0.25 to about 10% by weight, preferably about 0.25 to about 5% by weight, and most preferably about 1% by weight, based upon the total weight of the composition.

Suitable free radical-type photoinitiators include, for example, an acyl phosphine oxide photoinitiator, more specifically, a benzoyl diaryl phosphine oxide photoinitiator. Examples of suitable benzoyl diaryl phosphine oxide photoinitiators include: 2,4,6-trimethylbenzoyldiphenylphosphine oxide (Lucerin TPO available from BASF); and bis(2,6-dimethoxybenzoyl)-2,4,4-trimethylpentylphosphine oxide (Irgacure 1700 available from Ciba Additives, Tarrytown, N.Y.). Examples of other free radical-type photoinitiators that may be used in the present invention include:

hydroxycyclohexylphenylketone;
hydroxymethylphenylpropanone;
dimethoxyphenylacetophenone;
2-methyl-1-[4-(methyl thio)-phenyl]-2-morpholino-propanone-1;
1-(4-isopropylphenyl)-2-hydroxy-2-methylpropan-1-one;
1-(4-dodecyl-phenyl)-2-hydroxy-2-methylpropan-1-one;

4-(2-hydroxyethoxy)phenyl-2(2-hydroxy-2-propyl)-ketone;
diethoxyphenyl acetophenone;
2,4,6 trimethylbenzoyl diphenylphosphone;
a mixture of (2,6-dimethoxy benzoyl)-2,4,4 trimethylpentylphosphineoxide and 2-hydroxy-2-methyl-1-phenyl-propane-1-one; and mixtures of the foregoing.

Preferably, the free radical photoinitiator is a mixture of phosphine oxide photoinitiators an example of which is Darocur 4265. Free radical-type photoinitiators suitable for use in the present invention are available from Ciba Additives of Tarrytown, N.Y. They are sold under the names Irgacure® and Darocur®. Other suitable free radical-type photoinitiators will be apparent to one skilled in the art.

The free radical-type photoinitiator in accordance with the present invention may be used in an amount of about 0.25 to about 10% by weight, more preferably about 0.25 to about 5% by weight, and most preferably about 1% by weight based upon the total weight of the composition.

In accordance with the present invention, a reactive diluent or mixture of reactive diluents is included in the coating composition. While not wishing to be bound by theory, it is believed that, during the polymerization of the urethane acrylate oligomer, the reactive diluent hooks together chains of the urethane acrylate oligomer. In any event, adequate curing of the coating compositions of the present invention is ensured by the presence of the reactive diluent as it functions as a solvent improving the solubility of the aliphatic epoxide and the urethane acrylate oligomer in solution. The use of the reactive diluent also allows the formulator to adjust the viscosity of the solution to improve processability. The reactive diluent may, for example, be a lower molecular weight, liquid acrylate-functional compound include the following diacrylates and monofunctional acrylates.

1,6-hexanediol diacrylate,

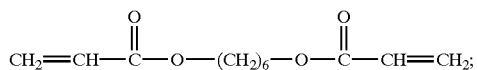

1,4-butanediol diacrylate,

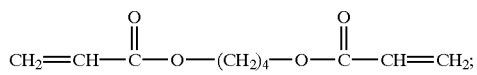

ethylene glycol diacrylate,

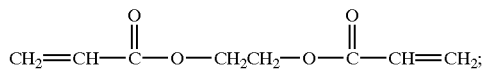

diethylene glycol diacrylate,

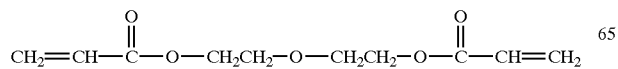

tetraethylene glycol diacrylate,

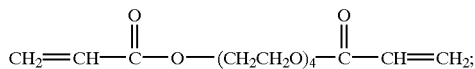

tripropylene glycol diacrylate,

neopentyl glycol diacrylate,

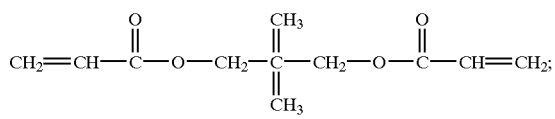

1,4-butanediol dimethacrylate,

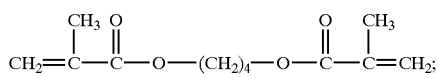

poly(butanediol)diacrylate,

tetrathylene glycol dimethacrylate,

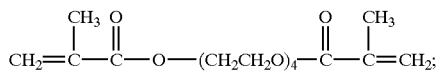

1,3-butylene glycol diacrylate,

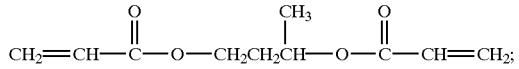

tetraethylene glycol diacrylate,

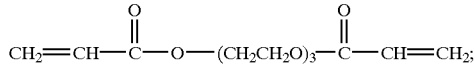

triisopropylene glycol diacrylate,

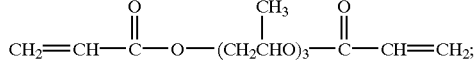

triisopropylene glycol diacrylate,

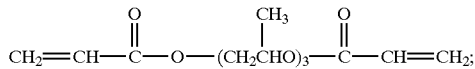

ethyoxylated bisphenol A diacrylate,

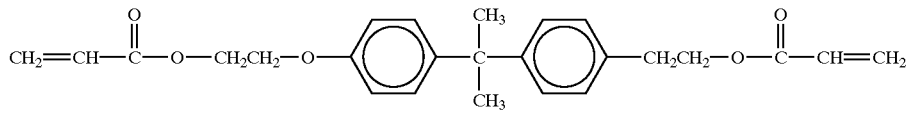

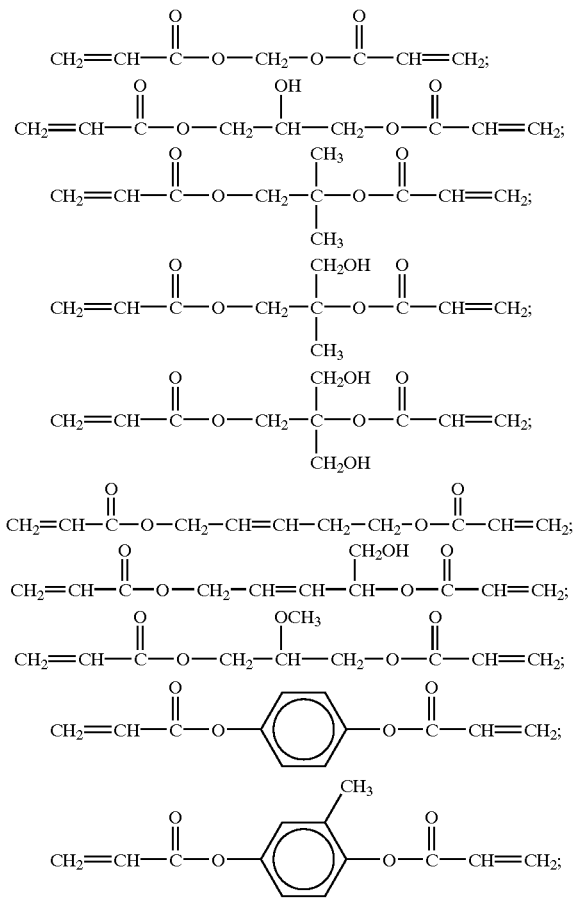

isoborynl acrylate

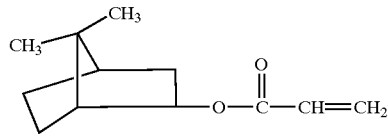

n-vinyl caprolactam

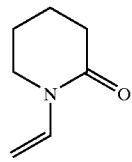

Preferably, lower molecular weight, liquid monofunctional acrylate compounds suitable for use as a reactive diluent(s) in accordance with the present invention are isobornyl acrylate and n-vinyl caprolactam. Other reactive diluents suitable for us in the present invention will be apparent to one skilled in the art.

The reactive diluent may be used in the coating composition in accordance with the present invention in an amount of from about 5 to about 80% by weight, preferably from about 5 to about 60% by weight, and most preferably about 30% by weight, based upon the total weight of the composition.

The coating compositions in accordance with the present invention preferably include an adhesion promoter. Suitable adhesion promoters for purposes of the present invention include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. Preferably, the organofunctional silane is mercaptoalkyl trialkoxy silane, a methacryloyxlalkyl trialkoxy silane, an aminoalkyl trialkoxyl silane, a vinyl trialkoxyl silane and mixtures thereof. More preferably, the organofunctional silane is 3-aminopropyl triethoxy silane, 3-methacryloxy-propyltrimethoxy silane, gamma-mercaptopropyl trimethoxy silane, gama-mercaptopropyl(gamma-mercaptopropyl)triethoxy silane, beta-(3,4-epoxycyclohexyl)ethyl trimethoxy silane, gamma-glycidoxypropyl trimethoxy silane, 3-vinylthiopropyl trimethoxy silane, vinyl-tris-(beta-methoxyethoxy)silane, vinyl triacetoxy silane, and mixtures thereof. A particularly preferred adhesion promoter is KBM 803 availiable from Shin-Etsu Silicones of America, Inc, of Torrance, Calif.

The adhesion promoter, if used, may be present in the coating composition in accordance with the present invention in an amount of from about 0.1 to about 10% by weight, more preferably from about 0.1 to about 3% by weight, and most preferably less than about 1% by weight, based upon the total weight of the composition.

Other components that may be utilized in the coating composition in accordance with the present invention include antioxidants, flow control agents, sensitizers, stabilizers, lubricants and wetting agents, as is conventional in the art.

The present formulation may include photosensitizers which absorb UV or visible light and transfer energy to the photoinitiators which induces additional decomposition of the photoinitiators with subsequent free radical formation. Examples of effective photosensitizers are thioxanthen-9-one, 2-isopropylthioxanthen-9-one and 10-phenylphenoxazine. The photosensitizer, if used, may be present in the coating composition in accordance with the present invention in an amount of from about 0.25 to about 10% by weight, more preferably about 0.25 to about 5% by weight, and most preferably about 1% by weight based upon the total weight of the composition.

In accordance with the present invention, the foregoing components are mixed or blended together using conventional equipment and an optical fiber may be coated with the coating composition in accordance with the present invention by any conventional optical fiber production technique.

The conventional techniques usually involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Optical fiber coating techniques that may be utilized in the present invention are disclosed in U.S. Pat. Nos. 4,374,161; 5,858,053; 4,962,992; 5,104,433, the disclosures of which are incorporated herein by reference. Other suitable optical fiber coating techniques that may be utilized in the present invention would be apparent to one skilled in the art.

The invention is further illustrated by the following examples which are set forth by way of illustration only and not by way of limitation.

EXAMPLE 1

Optical Fiber Primary Coating Composition

Cycloaliphatic epoxide (Uvacure 1500 available from UCB Chemical Corp., of Smyrna Ga.) and aliphatic urethane diacrylate oligomer (Ebecryl 230 also availiable from UCB Chemical Corp., of Smyrna Ga.) were blended in a 1:1 ratio with 20% by weight of tripropylene glycol diacrylate (TPGDA) as a reactive diluent. Two photoinitiators were used: Darocur 4265 a free radical photoinitiator availiable from Ciba Additives of Tarrytown, N.Y., and KI 85, a cationic photoinitiator availiable from Sartomer Co., of Exton, Pa. The photoinitiators were added in a 1:1 ratio at a total of 5% by weight based upon the total weight of the cycloaliphatic epoxide and aliphatic urethane diacrylate oligomer blend.

A 115 μm film was cast and cured via an Iwasaki lamp at a level of 1 joule per square centimeter (one side only). Dynamic mechanical analysis (procedure listed in "description of testing" below) was conducted and the following results were obtained:

Tg occured at a temperature of −38 C. consistent with the glass transistion typically seen in good optical fiber primary coatings.

Instron Materials Testing was also conducted (procedure also described in the below "Description of Testing") and the following measurements were obtained:

Secant Modulus 2.0 Mpa; Elongation at Break 70%

Adhesion to glass appeared to be excellent. All measured properties were consistent with those found in good optical fiber primary coatings.

Description of Testing
Dynamic Mechanical Analysis

The storage modulus (E'), the loss modulus (E"), and the tan delta (E"/E') of the examples were measured using a Rheometrics Solids Analyzer (RSA-II), equipped with:

1) A personal computer having a Windows 95™ operating system and loaded with Rheometrics Orchestrator™ software (version 6.4.3) available from Rheometrics Scientific, Piscataway N.J., USA.

2) A liquid nitrogen controller system for low-temperature operation

The test samples were prepared by casting a film of the coating having a thickness in the range of 0.02 mm to 0.4 mm, on a glass plate. The cast film was cured using an Iwasaki UV processor. A specimen approximately 25 mm in length and 6.25 mm wide was cut from a defect-free region of the cured film. The film thickness was measured at three or more locations along the length of the sample. The average film thickness was calculated to 0.001 mm. The thickness did not vary by more than 0.01 mm over this length. The width of the sample was measured at two or more locations and the average value calculated to 0.1 mm.

The measured geometry of the samples was entered into the Rheometrics Orchestrator™ software. The length field was set at a value of 22.5 mm and the average values of width and thickness were entered into the appropriate fields.

The temperature sweep used included cooling the test samples to −80C. and increasing the temperature at about 3 C. per minute until the temperature reached 100 C. The test frequency used was 62.8 radians per second.

Instron Materials Testing

The tensile strength of cured samples was tested using a universal testing instrument, Instron Model 5564 equipped with a personal computer and loaded with Instron Merlin™ software (version 7.50.00). The load cell used has a 50N capacity. ASTM D638M was generally followed with the below modifications noted.

The test samples were prepared by casting a film of the coating, having a thickness in the range of 0.02 mm to 0.4 mm, on a glass plate. The cast film was cured using an Iwasaki UV processor.

A specimen 30 mm long and 6.25 mm wide was cut from a defect-free region of the cured film. A minimum of six test specimens were cut for analysis. The sample edges were inspected for any defects and were discarded if any visible defects were present.

The average film thickness was measured to +/−0.001 mm. The thickness did not vary by more than 0.01 mm over the length of the sample. If the above condition was not met, the sample was discarded. The width of the sample was measured at three or more locations and the average value calculated to 0.01 mm. The surface area of each specimen was calculated and entered into the appropriate field in the Merlin™ software. The crosshead speed was set to 25.0 mm per minute, and the crosshead action was set to "return at break". Pneumatic air grips were used and were set to approximately 40 mm apart.

After the Instron materials tester had been allowed to warm-up for twenty minutes, it was calibrated and the load cell balanced following the manufacturer's instructions. The temperature and humidity of the tensile testing laboratory were monitored with a temperature/humidity gage. If the temperature was not within the range of 25+/−2 C. and the relative humidity was not within the range of 50+/−5%, specimens were not analyzed.

Each test specimen was tested by suspending it into the space between the pneumatic grips. The specimen was centered and allowed to hang vertically between the grips. After ensuring that no slack in the specimen was present and that the specimen was centered, the pneumatic grips were closed.

Each specimen was tested by initiating the crosshead to extend until the specimen breaks. The specimen stress/strain data was analyzed via the Merlin™ software. The mean values of Secant Modulus, and Elongation at break were reported.

EXAMPLE 2

Optical Fiber Secondary Coating Composition

The following components were blended together in the weight percentages listed below:

| | |
|---|---|
| Cycloaliphatic Epoxide (Uvacure 1500 availiable from UCB Chemical Corp., Smyrna, Ga) | 40% |
| Aliphatic Urethane Diacrylate Oligomer (based upon 1,6 hexanediol, see below description) | 40% |
| Tri-propylene glycol diacrylate (Sartomer Co., Exton Pa) | 15% |
| Cationic Photoinitiator KI 85 (Sartomer Co., Exton Pa) | 2.5% |
| Free Radical Photoinitiator Darocur 4265 (Ciba Additives., Tarrytown, NY) | 2.5% |

The aliphatic urethane diacrylate oligomer used in Example 2 was prepared in the following way. 90 g of isophorone diisocyanate (IPDI) of Aldrich was charged to a 250 ml reaction vessel. 1.2 g of dibutyltin dilaurate of Aldrich and 0.8 g of 2,6-di-tert-butyl-4-methylphenol (ionol) of Aldrich were added along with 90 g of tripropyleneglycol diacrylate (TRPGDA) of Sartomer. The temperature of the reaction solution was elevated to 75 C. and the solution was permanently stirred with a mechanical stirrer. 24 g of 1,6 hexanediol of Aldrich were added, resulting in an exothermic addition reaction. The rate of addition of the diol was slow in order to prevent elevation of the reaction temperature above 90 C. IR spectroscopy of the reaction mixture revealed the disappearance of the asymmetric stretch of the N=C=O group at 2270 $cm^{-1}$. Several hours after addition of the diol the IR spectrum of the mixture did not change and no further disappearance of the asymmetric stretch of the N=C=O group at 2270 $cm^{-1}$ was noted. 66 g of 2-hydroxyethyl acrylate of Aldrich was then added slowly. The complete disappearance of the isocyanate group (N=C=O) group from the IR spectrum of the mixture was observed after addition of the 2-hydroxyethyl acrylate to the reaction mixture. This indicated the completion of the reaction forming the oligomer.

The amounts of the reagents above can be changed proportionally to allow the synthesis of larger batches of the oligomer. The typical molecular weights of the oligomer synthesized above is 1000 g to 5000 g.

A 140 μm film was cast of the above coating formulation (Example 2) and cured via an Iwasaki lamp at a level of 1 joule per square centimeter (one side only). Dynamic mechanical analysis was conducted (procedure described in above "Description of Testing") and the following result was obtained:

Tg occurred at a temperature of 40 C., which is consistent with the glass transistion typically associated with a good optical fiber secondary coating.

Instron materials testing was also conducted (procedure also described above in "Description of Testing") and the following results were obtained Secant Modulus 81.0 Mpa, Elongation at Break 44%

The above properties of the cured film were consistent with those typically found in good optical fiber secondary coatings.

EXAMPLE 3

Optical Fiber Primary Coating Composition

The following components were blended together in the weight percentages shown below:

| | |
|---|---|
| Cycloaliphatic Epoxide (Uvacure 1533; UCB Chemical Corp., Smyrna Ga) | 20% |
| Aliphatic Urethane Diacrylate Oligomer (Ebecryl 230, UCB Chemical Corp., Smyrna Ga) | 45% |
| Isobornyl Acrylate (Reactive Diluent) | 19% |
| N-Vinyl Caprolactam (Reactive Diluent) | 13% |
| KBM 803 Adhesion Promoter (Shin-Etsu., Torrance Ca.) | 0.1% |
| Cationic Photoinitiator KI 85 (Sartomer Co., Exton Pa) | 1.0% |
| Free Radical Photoinitiator Darocur 4265 (Ciba Additives, Tarrytown NY) | 1.9% |

A 150 micron film was cast and cured via an Iwasaki lamp at a level of 1 joule per square centimeter. Dynamic mechanical analysis was performed (procedure described above in "Description of Testing") and the following result was obtained:

Tg occurred at a temperature of −38 C. which is consistent with glass transitions typically found in good optical fiber primary coatings.

Instron materials testing was also performed (procedure also described above in "Description of Testing") and the following results were obtained:

Secant Modulus 1.4 Mpa; Elongation at Break 307%

Adhesion to glass appeared to be excellent. All of the above properties were consistent with those typically found in good optical fiber primary coatings.

EXAMPLE 4

Optical Fiber Primary Coating

The following components were blended together in the weight percentages shown below:

| | |
|---|---|
| Cycloaliphatic Epoxide (Uvacure 1533, UCB Chemical Corp., Smyrna Ga) | 20% |
| Aliphatic Urethane Diacrylate Oligomer (Ebecryl 230, UCB Chemical Corp., Smyrna Ga) | 45% |
| Isobornyl Acrylate (Reactive Diluent) | 5% |
| N-Vinyl Caprolactam (Reactive Diluent) | 5% |
| KBM 803 (Adhesion Promoter) | 0.1% |
| Tridecyl Acrylate (Reactive Diluent) | 22.0% |
| Cationic Photoinitiator KI 85 (Sartomer Co., Exton, Pa) | 1.0% |
| Free Radical Photoinitiator Darocur 4265 (Ciba Additives, Tarrytown NY) | 1.9% |

A 135 micron film was cast and cured via an Iwasaki lamp at a level of 1 Joule per square centimeter. Dynamic Mechanical Analysis was performed (procedure described above in "Description of Testing") and the following result was obtained:

Tg occurred at a temperature of −16 C. which is consistent with glass transitions typically found in good optical fiber primary coatings.

Instron Materials testing was also performed (procedure also described in "Description of Testing") and the following results were obtained:

Secant Modulus 1.2 Mpa; Elongation at Break 100%

All of the above properties are consistent with good optical fiber primary coatings.

EXAMPLE 5

Coated Optical Fiber

An optical fiber coated with the formulation described in Example 4 was tested in accordance with Bellcore standard procedures (GR-20 Core Issue 2, July 1998) and the following results were obtained:

| | |
|---|---|
| Unaged Tensile Strength | 679.6 Kpsi |
| Unaged Tensile Slope (Weibull) | 94 |
| Unaged Strip Force | 0.45 lbs |

The above results meet the requirements for optical fiber per Bellcore standards found in the document above.

EXAMPLE 6

Coated Optical Fiber

An optical fiber coated with the formulation described in Example 4 was tested in accordance with Bellcore standard procedures (GR-20 Core Issue 2, July 1998) and the following results were obtained:

| | |
|---|---|
| Unaged Tensile Strength | 682 Kpsi |
| Unaged Tensile Slope (Weibull) | 118 |
| Unaged Strip Force | 0.47 lbs |

The above results meet the requirements for optical fiber per Bellcore standards found in the document above.

EXAMPLE 7

Optical Fiber Primary Coating

The following components were blended together in the weight percentages shown below:

| | |
|---|---|
| Cycloaliphatic Epoxide Uvacure 1532 (UCB Chemical Corp., Smyrna Ga) | 20% |
| Aliphatic Urethane Diacrylate oligomer Ebecryl 230 (UCB Chemical Corp., Smyrna Ga) | 60% |
| Isobornyl Acrylate (Reactive Diluent) | 8.95% |
| Tridecyl Acrylate (Reactive Diluent) | 8.95% |
| KBM 803 (Adhesion Promoter) | 0.10% |
| Cationic Photoinitiator KI 85 (Sartomer Co., Exton Pa) | 1.0% |
| Free Radical Photoinitiator Irgacure 819 (Ciba Additives., Tarrytown NY) | 1.0% |

A 160 micron film was cast and cured via an Iwasaki lamp at a level of 1 Joule per square centimeter. Dynamic Mechanical Analysis was performed (procedure described above in "Description of Testing") and the following result was obtained:

Tg occurred at a temperature of −32 C. which is consistent with glass transitions typically found in good optical fiber primary coatings. Instron Materials Testing was also performed (procedure described in "Description of Testing") and the following results were obtained:

Secant Modulus 1.3 Mpa, Elongation at Break 110%

All of the above properties were consistent with good optical fiber primary coatings.

EXAMPLE 8

Optical Fiber Primary Coating

The below components are blended together in the weight percentages shown:

| | |
|---|---|
| Cycloaliphatic Epoxide Uvacure 1532 (UCB Chemical Corp., Smyrna Ga) | 20% |
| Aliphatic Urethane Acrylate CN966J75 Polyester Oligomer (Sartomer Co., Exton, Pa) | 40% |
| Isobornyl Acrylate (Reactive Diluent) | 18.95% |
| Tridecyl Acrylate (Reactive Diluent) | 18.95% |
| KBM 803 (Adhesion Promoter) | 0.10% |
| Cationic Photoinitiator KI 85 (Sartomer Co., Exton Pa) | 10% |
| Free Radical Photoinitiator Irgacure 819 (Ciba Additives, Tarrytown NY) | 1.0% |

A film of the above coating composition would be expected to have a Tg of from 0 C. to −10 C., a secant modulus between 1.0 to 1.5 MPa and an elongation at break of greater than 80%.

EXAMPLE 9

Optical Fiber Primary Coating

The components below are blended in the weight percentages shown:

| | |
|---|---|
| Cycloaliphatic Epoxide Uvacure 1532 (UCB Chemical Corp., Smyrna Ga) | 20% |
| Aliphatic Urethane Acrylate based upon a Polycarbonate backbone (PPG Ind. USA) | 50% |
| Isobornyl Acrylate (Reactive diluent) | 13.95% |
| Tridecyl Acrylate (Reactive diluent) | 13.95% |
| KBM 803 (Adhesion Promoter) | 0.10% |
| Cationic Photoinitiator KI 85 (Sartomer Co., Exton Pa) | 1.0% |
| Free Radical Photoinitiator Irgacure 819 (Ciba Additives., Tarrytown NY) | 1.0% |

A film of the above coating composition would be expected to have a Tg of from 0 C. to 15 C., a secant modulus between 1.2 to 1.5 MPa and an elongation at break of greater than 90%.

EXAMPLE 10

Optical Fiber Primary Coating

The below components are blended together in the weight percentages shown:

| | |
|---|---|
| Cycloaliphatic Epoxide Uvacure 1532 (UCB Chemical Corp., Smyrna Ga) | 20% |
| Aliphatic Urethane Acrylate based upon a polybutadiene backbone Echo MBN (Echo Resins, Versailles Mo) | 50% |
| Isobornyl Acrylate (Reactive Diluent) | 13.95% |
| Tridecyl Acrylate (Reactive Diluent) | 8.95% |
| N-Vinyl Caprolactam (Reactive Diluent) | 5.00% |
| KBM 803 (Adhesion Promoter) | 0.10% |
| Cationic Photoinitiator KI 85 (Sartomer Co., Exton Pa) | 1.00% |
| Free Radical Photoinitiator Irgacure 819 (Ciba Additives., Tarrytown NY) | 1.00% |

A film of the above coating composition would be expected to have a Tg of from −10 C. to 0 C., a secant modulus between 1.0 to 1.5 MPa and an elongation at break of greater than 80%.

Comparative Examples

To demonstrate the advantages of the hybrid system of the present invention over conventional optical fiber coating systems, the following components were together in the weight percentages shown below:

Comparative Example 1

Optical Fiber Primary Coating

| | |
|---|---|
| Aliphatic Urethane Diacrylate Oligomer (Ebecryl 230, UCB Chemical Corp., Smyrna Ga) | 74.9% |
| Isobornyl Acrylate (Reactive Diluent) | 12% |
| N-Vinyl Caprolactam (Reactive Diluent) | 12% |
| KBM 803 Adhesion Promoter (Shin-Etsu., Torrance Ca.) | 0.1% |
| Free Radical Photoinitiator Darocur 4265 (Ciba Additives, Tarrytown NY) | 1.0% |

A 150 micron film was cast and cured via an Iwasaki lamp at a level of 1 joule per square centimeter. Dynamic mechanical analysis was performed (procedure described above in "Description of Testing") and the following result was obtained:

Tg occurred at a temperature of 9 C. This Tg is higher than would be expected of a good optical fiber primary coating and lower than expected of a good optical fiber secondary coating. Furthermore, Instron materials testing revealed mechanical properties such as secant modulus and elongation that were substandard as compared to the hybrid coating systems of the present invention.

A film of the above coating composition would be expected to have a secant modulus less than 1.0 MPa and an elongation of break of less than 50%.

Comparative Example 2

Optical Fiber Primary Coating

| | |
|---|---|
| Cycloaliphatic Epoxide Uvacure 1532 (UCB Chemical Corp., Smyrna Ga) | 97% |
| Cationic Photoinitiator KI 85 (Sartomer Co., Exton Pa) | 3.0% |

The use of a cycloaliphatic epoxide alone without the urethane diacrylate oligomer results in a coating composition that will not cure sufficiently even under high UV doses above 1 joule per square centimeter. Typically the UV dosages in optical fiber manufacturing are much lower that 1.0 joule per square centimeter.

Comparative Example 3

Optical Fiber Primary Coating (IPN)

The following components were blended together in the weight percentages shown below:

| | |
|---|---|
| Kraton L-207 Aliphatic Epoxide, Sheel Co., Houston, TX | 45% |
| Lauryl Acrylate Monomer, Sartomer Co., Exton, PA | 50% |
| Cationic Photoinitiator KI 85, Sartomer Co., Exton, PA | 2.5% |
| Free Radical Photoinitiator Darocur 4265, Ciba, Tarrytown, NY | 2.5% |

The above mixture phase separated and an IPN was unable to be obtained.

Stress Relaxation Studies

Comparisons of the stress relaxation master curve obtained via Dynamic Mechanical Analysis of Example 7 at a reference temperature of −50 C. was compared to the stress relaxation master curves of commercially available, typical non IPN optical fiber coating systems at a reference temperature of −50 C. The data is summarized in the below table:

| Description of Polymeric backbone | Tg | E(t) dyn/cm$^2$ | time (sec) |
|---|---|---|---|
| IPN Example 7 | −32 C. | $1.37 \times 10^8$ | 70 |
| Polybutadiene | −22 C. | $4.51 \times 10^9$ | 70 |
| Polyether | −22 C. | $1.71 \times 10^9$ | 70 |

One can see that the effect of having greater free volume due to the IPN and low Tg of the formulation described in the present invention causes at least a one order of magnitude increase in stress relaxation over the systems typically found in the prior art. This improvement in relaxation greatly enhances the ability of the present invention to overcome small stresses placed upon the optical fibers coated therewith during the cabling process (microbending stresses) and will help eliminate low temperature attenuation of the signal through the fiber due to those stresses. This will greatly increase the efficiency of the optical fiber to transmit light.

The above data was obtained using Frequency Sweeps from 0.1 rad/sec. to 100 rad/sec at five degree increments on cured films utilizing a Rheometrics Solids Analyzer RSA II and Orchestrator™ software version 6.4.3. The frequency sweeps were overlaid using time temperature superposition features found in the above software. Master Curves were then constructed from the time temperature superposition plots at the reference temperature given. These Master Curves were then converted to Stress Relaxation Curves via the Stress Relaxation Conversion algorithm found in the software above.

Although the present application has been described in connection with a preferred embodiment thereof, many other variations and modifications will become apparent to those skilled in the art without departure from the scope of the invention. It is preferred, therefore, that the present invention not be limited by the specific disclosure herein, but only by the appended claims.

What is claimed is:

1. A liquid, radiation curable composition for coating an optical waveguide, comprising an aliphatic epoxide, a urethane diacrylate oligomer, a cationic photoinitiator, a free radical photoinitiator, and a reactive diluent, said cationic photoinitiator being present in said composition in an amount effective to initiate polymerization of said aliphatic epoxide, and said free radical photoinitiator being present in said composition in an amount effective to initiate polymerization of said urethane diacrylate oligomer, wherein said aliphatic epoxide and said urethane diacrylate oligomer are present in said coating composition in a ratio of about 1:9 to 9:1.

2. The coating composition of claim 1, wherein said aliphatic epoxide and said urethane diacrylate oligomer are present in said coating composition in a ratio of about 1:3 to about 3:1.

3. The coating composition of claim 1, wherein said cationic photoinitiator is present in said composition in an amount of about 0.25 to about 10% by weight based upon the total weight of said composition.

4. The coating composition of claim 1, wherein said free radical photoinitiator is present in said composition in an amount of about 0.25 to about 10% by weight based upon the total weight of said composition.

5. The coating composition of claim 1, wherein said aliphatic epoxide is a cycloaliphatic epoxide or blend of cycloaliphatic epoxides.

6. The coating composition of claim 5, wherein said cycloaliphatic epoxide is a 3,4-epoxycyclohexylmethyl-3,4-epoxycyclohexane carboxylate having the general formula:

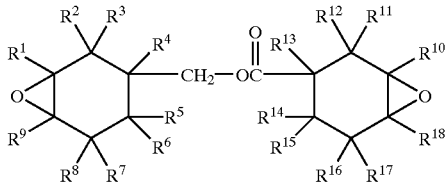

wherein $R^1$ through $R^{18}$, which can be the same or different, are each either a hydrogen or an alkyl radical containing one to nine carbon atoms.

7. The coating composition according to claim 6, wherein said alkyl radical contains from one to three carbon atoms.

8. The coating composition according to claim 6, wherein the cycloaliphatic epoxide is selected from the group consisting of 3,4-epoxycyclohexylmethyl-3,4-epoxycyclohexane carbonate; 3,4-epoxy-1-methylcyclohexyl methyl-3,4-epoxy-1-methylcyclohexane carboxylate; 6-methyl-3,4-epoxycyclohexymethyl-6-methyl-3,4-epoxycyclohexane carboxylate; 3,4-epoxy-3-methylcyclohexylmethyl-3,4-epoxy-3-methylcyclohexane carboxylate; and 3,4-epoxy-5-methylcyclohexylmethyl-3,4-epoxy-5-methylcyclohexane carboxylate.

9. The coating composition of claim 1, wherein said urethane diacrylate oligomer is the reaton product of a polyol and a multifunction isocyanate.

10. The coating composition of claim 9, wherein said polyol is selected from the group consisting of: a polyether polyol; a polyester polyol; a polycarbonate polyol; a hydrocarbon polyol; a polybutandiene polyol; a copolymer of sid polyols; and mixtures thereof.

11. The coating composition of claim 1, wherein said cationic photoinitiator is an aromatic onium salt.

12. The coating composition of claim 1, wherein said cationic photoinitiator is present in an amount of about 0.25 to about 10% by weight based upon the total weight of said composition.

13. The coating composition of claim 1, wherein said free radical photoinitiator is an acyl phosphine oxide photoinitiator or blends of acyl phosphine oxide photoinitiators.

14. The coating composition of claim 1, wherein said free radical photoinitiator is present in an amount of about 0.25 to about 10% by weight based upon the total weight of said composition.

15. The coating composition of claim 1, wherein said reactive diluent is an acrylate functional compound.

16. The coating composition of claim 1, wherein said reactive diluent is present in an amount of about 5 to about 80% by weight based upon the total weight of said composition.

17. An optical fiber having a coating layer thereon, said coating layer being the radiation-cured product of a coating composition comprising an aliphatic epoxide, a urethane diacrylate oligomer, a cationic photoinitiator, a free radical photoinitiator, and a reactive diluent, said cationic photoinitiator being present in said composition in an amount effective to initiate polymerization of said cycloaliphatic epoxide, and said free radical photoinitiator being present in said composition in an amount effective to initiate polymerization of said urethane diacrylate oligomer.

18. The optical fiber of claim 17, wherein said aliphatic epoxide and said urethane acrylate oligomer are present in said coating composition in a ratio of about 1:9 to about 9:1.

19. The optical fiber of claim 18, wherein said aliphatic epoxide and said urethane acrylate oligomer are present in said coating composition in a ratio of about 1:9 to about 9:1.

20. The optical fiber of claim 17, wherein said cationic photoinitiator is present in said composition in an amount of about 0.25 to about 10% by weight based upon the total weight of said composition.

21. The optical fiber of claim 17, wherein said free radical photoinitiator is present in said composition in an amount of about 0.25 to about 10% by weight based upon the total weight of said composition.

22. The coating composition of claim 16, wherein said aliphatic epoxide is a cycloaliphatic epoxide, or blend of cycloaliphatic epoxides.

23. The optical fiber of claim 16, wherein said cycloaliphatic epoxide is a 3,4-epoxycyclohexylmethyl-3,4-epoxycyclohexane carboxylate having the general formula:

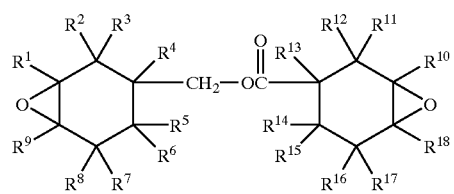

wherein $R^1$ through $R^{18}$, which can be the same or different, are each either a hydrogen or an alkyl radical containing one to nine carbon atoms.

24. The optical fiber according to claim 23, wherein said alkyl radical contains from one to three carbon atoms.

25. The optical fiber according to claim 23, wherein said cycloaliphatic epoxide is selected from the group consisting of 3,4-epoxycyclohexylmethyl-3,4-epoxycyclohexane carboxylate; 3,4-epoxy-1-methylcyclohexyl methyl-3,4-epoxy-1-methylcyclohexane carboxylate; 6-methyl-3,4-epoxycyclohexymethyl-6-methyl-3,4-epoxycyclohexane carboxylate; 3,4-epoxy-3-methylcyclohexylmethyl-3,4-epoxy-3-methylcyclohexane carboxylate; and 3,4-epoxy-5-methylcyclohexylmethyl-3,4-epoxy-5-methylcyclohexane carboxylate.

26. The optical fiber according to claim 17, wherein said urethane diacrylate oligomer is the reaction product of a polyol and a multifunctional isocyanate, the urethane diacrylae being end-capped with a hydroxy functional acrylate.

27. The optical fiber according to claim 26, wherein said polyol is selected from the group consisting of: a polyether polyol; a polyester polyol; a polycarbonate polyol; a hydrocarbon polyol; a polybutadiene polyol; a copolymer of said polyols; and mixtures thereof.

28. The optical fiber of claim 17, wherein said cationic photoinitiator is present in an amount of about 0.25 to about 10% by weight based upon the total weight of said composition.

29. The optical fiber of claim 17, wherein said free radical photoinitiator is an acyl phosphine oxide photoinitiator.

30. The optical fiber of claim 17, wherein said free radical photoinitiator is present in an amount of about 0.25 to about 10% by weight based upon the total weight of said composition.

31. The optical fiber of claim 17, wherein said reactive diluent is an acrylate functional compound.

32. The optical fiber of claim 17, wherein said reactive diluent is present in an amount of about 5 to about 80% by weight based upon the total weight of said composition.

33. A liquid, radiation curable composition for coating an optical waveguide, comprising an aliphatic epoxide, a urethane acrylate oligomer, a cationic photoinitiator, a free radical photoinitiator, and a reactive diluent, said cationic photoinitiator being present in said composition in an amount effective to initiate polymerization of said aliphatic epoxide, said free radical photoinitiator being present in said composition in an amount effective to initiate polymerization of said urethane diacrylate oligomer, wherein said urethane acrylate oligomer is the reaction product of a polyol and a multifunctional isocyanate, the urethane acrylate being end-capped with a hydroxy functional acrylate, and said polyol is selected from the group consisting of: a polyether polyol; a polyester polyol; a polycarbonate polyol; a hydrocarbon polyol; a polybutadiene polyol; a copolymer of said polyols; and mixtures thereof.

34. The coating composition of claim 33, wherein said aliphatic epoxide and said urethane acrylate oligomer are present in said coating composition in a ratio of about 1:3 to about 3:1.

35. The coating composition of claim 33, wherein said cationic photoinitiator is present in said composition in an amount of about 0.25 to about 10% by weight based upon the total weight of said composition.

36. The coating composition of claim 33, wherein said free radical photoinitiator is present in said composition in an amount of about 0.25 to about 10% by weight based upon the total weight of said composition.

37. The coating composition of claim 33, wherein said aliphatic epoxide is a cycloaliphatic epoxide or blend of cycloaliphatic epoxides.

38. The coating composition of claim 37, wherein said cycloaliphatic epoxide is a 3,4-epoxycyclohexylmethyl-3,4-epoxycyclohexane carboxylate having the general formula:

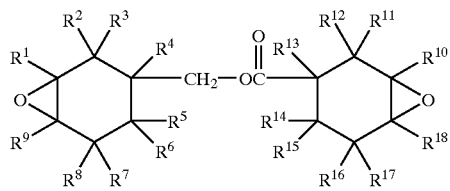

where $R^1$ through $R^{18}$, which can be the same or different, are each either a hydrogen or an alkyl radical containing one to nine carbon atoms.

39. The coating composition according to claim 38, wherein said alkyl radical contains from one to three carbon atoms.

40. The coating composition according to claim 38, wherein the cycloaliphatic epoxide is selected from the group consisting of 3,4-epoxycyclohexylmethyl-3,4-epoxycyclohexane carboxylate; 3,4-epoxy-1-methylcyclohexyl methyl-3,4-epoxy-1-methylcyclohexane carboxylate; 6-methyl-3,4-epoxycyclohexymethyl-6-methyl-3,4-epoxycyclohexane carboxylate; 3,4-epoxy-3-methylcyclohexylmethyl-3,4-epoxy-3-methylcyclohexane carboxylate; and 3,4-epoxy-5-methylcyclohexylmethyl-3,4-epoxy-5-methylcyclohexane carboxylate.

41. The coating composition of claim 33, wherein said cationic photoinitiator is an aromatic onium salt.

42. The coating composition of claim 33, wherein said cationic photoinitiator is present in an amount of about 0.25 to about 10% by weight based upon the total weight of said composition.

43. The coating composition of claim 33, wherein said free radical photoinitiator is an acyl phosphine oxide photoinitiator or blends of acyl phosphine oxide photoinitiators.

44. The coating composition of claim 33, wherein said free radical photoinitiator is present in an amount of about 0.25 to about 10% by weight based upon the total weight of said composition.

45. The coating composition of claim 33, wherein said reactive diluent is an acrylate functional compound.

46. The coating composition of claim 33, wherein said reactive diluent is present in an amount of about 5 to about 80% by weight based upon the total weight of said composition.

* * * * *